US006629671B1

United States Patent
Hilsenbeck (10) Patent No.: US 6,629,671 B1
(45) Date of Patent: Oct. 7, 2003

(54) AIRLINE SEAT PARACHUTE

(76) Inventor: Pete K. Hilsenbeck, 5245 W. 86th Ave., Arvada, CO (US) 80003

( * ) Notice: Subject to any disclaimer, the term of this patent is extended or adjusted under 35 U.S.C. 154(b) by 0 days.

(21) Appl. No.: 10/273,106

(22) Filed: Oct. 18, 2002

(51) Int. Cl.[7] ............................................. B64D 25/04
(52) U.S. Cl. ........................ 244/142; 244/141; 244/148
(58) Field of Search ................................. 244/141, 142, 244/144, 151 R, 138 R, 122 R, 148, 147

(56) References Cited

U.S. PATENT DOCUMENTS

| | | | | |
|---|---|---|---|---|
| 2,130,547 A | * | 9/1938 | Irvin ....................... | 244/151 R |
| 2,192,113 A | * | 2/1940 | Waite ...................... | 244/122 R |
| 2,495,381 A | * | 1/1950 | Moran .................. | 244/122 AH |
| 3,436,037 A | | 4/1969 | Stanley | |
| 3,516,098 A | | 6/1970 | O'Link | |
| 3,726,499 A | | 4/1973 | Stencel | |
| 3,862,731 A | | 1/1975 | McIntyre | |
| 4,004,764 A | | 1/1977 | Burklund et al. | |
| 4,306,748 A | | 12/1981 | Sullivan | |
| 4,527,758 A | | 7/1985 | Ayoub et al. | |
| 4,619,623 A | | 10/1986 | Elverskog | |
| 4,709,885 A | | 12/1987 | Martin | |
| 4,765,570 A | | 8/1988 | Herndon | |
| 4,775,119 A | | 10/1988 | Aronne | |
| 4,865,273 A | | 9/1989 | Jones | |
| 5,213,392 A | | 5/1993 | Bostrom et al. | |
| 5,342,109 A | | 8/1994 | Berry et al. | |
| 5,825,667 A | | 10/1998 | Van Den Broek | |
| 5,979,829 A | | 11/1999 | Nance et al. | |

FOREIGN PATENT DOCUMENTS

| | | | | |
|---|---|---|---|---|
| CH | 680357 A5 | * | 8/1992 | .......... A41D/13/00 |
| GB | 640520 | | 7/1950 | |
| GB | 2118498 | | 11/1983 | |
| WO | 00/56600 | | 9/2000 | |

* cited by examiner

*Primary Examiner*—Peter M. Poon
*Assistant Examiner*—Timothy D. Collins (57) ABSTRACT

A parachute is stored within the specially configured seat back of each passenger seat of a commercial aircraft, behind a removable front upholstery panel. The parachute harness extends outwardly from the concealed parachute, through and beyond the periphery of the removable panel, for donning by the seated passenger. An openable upper cover extends over the top of the concealed parachute. When the parachute is needed, the passenger (having previously donned the parachute harness) pulls forward from the seat to release the front upholstery panel from the seat back to pull the parachute free, and escapes from the aircraft. In the event the seat structure separates from the aircraft, the still seated passenger opens the top flap of the seat back to access the parachute rip cord. A second embodiment comprises a child harness having a series of D-rings thereon, for face-to-face attachment to the parachute harness of an accompanying adult.

20 Claims, 4 Drawing Sheets

AIRLINE SEAT PARACHUTE

BACKGROUND OF THE INVENTION

1. Field of the Invention

The present invention relates generally to passenger protection and safety systems for airline aircraft, and more specifically to an individual parachute system for each passenger seat on an airline aircraft. The present invention generally comprises an individual parachute removably installed within a cavity formed in the seat back of each passenger seat aboard an airline aircraft. The parachute harness extends forwardly from the seat back for donning by the seated passenger.

2. Description of the Related Art

While airline safety has seen continuous improvement over the years, the airline industry cannot provide one hundred percent safety to its passengers. Any time a complex machine is traveling at a high rate of speed, there is some element of danger, even if that element is quite small. While various safety devices have been installed in airline aircraft in the past, and in fact are required by regulation (e.g., flotation devices for overwater flights, and emergency oxygen equipment), there has never been any requirement for emergency parachute equipment to be provided on board for airline passengers.

In the past, most parachutes tended to be relatively bulky and heavy, and the placement of emergency parachutes within the passenger cabin of an airliner was impractical, due to the reduction of payload and interior cabin volume. However, the parachute industry has seen significant advances in emergency parachutes in the relatively recent past. Many emergency parachutes are now capable of supporting persons of significant weight and withstanding opening shocks at relatively high velocities, all while conforming to a back pack configuration having a thickness of only three inches or so, and a weight of less than fifteen pounds.

The configuration of the modern emergency parachute lends itself to convenient storage within the seat back of an otherwise conventional airline passenger seat, with the seat back modified to provide a cavity or receptacle for such an emergency parachute. Accordingly, the present invention provides such an airline seat configuration, with an emergency parachute stored within the modified seat back structure for ready removal and deployment as needed. The forward panel of the seat back upholstery is removably secured over the parachute, with the parachute harness extending forwardly from the seat back for the passenger to don for potential emergency use. The present invention also provides a child harness which removably attaches to the front of the seat back parachute harness, enabling infants or small children to escape with their parent or guardian. While successful escape from an airliner may be difficult, the present invention at least opens the door for possible survival in an otherwise likely fatal accident.

A discussion of the related art of which the present inventor is aware, and its differences and distinctions from the present invention, is provided below.

U.S. Pat. No. 3,436,037 issued on Apr. 1, 1969 to Robert M. Stanley, titled "Apparatus For Deploying And Opening Parachutes," describes an emergency parachute using a small rocket to deploy the chute. The rocket is jettisoned from the parachute pack, and then ignited to pull the parachute from the pack. The Stanley parachute deployment device is primarily directed to military chutes which are generally worn directly upon the back of the pilot, rather than to an emergency parachute which is stored within a cavity in a seat back structure, as is the case with the present invention.

U.S. Pat. No. 3,516,098 issued on Jun. 23, 1970 to Maurice H. O'Link, titled "Floatable Life Preserver Seat Insert," describes is a buoyant cushion which is removable from the bottom of the seat structure. The cushion serves as a seat cushion during normal use, but is easily and quickly removed for use as a float in the event of a water emergency landing. No parachute is disclosed, either in the bottom or the back of the seat.

U.S. Pat. No. 3,726,499 issued on Apr. 10, 1973 to Fred B. Stencel, titled "Method Of Deploying A Parachute By A Rocket Under Low Speed Conditions," describes another ejection seat system, utilizing a rocket to deploy an emergency parachute from a seat back structure. The parachute remains attached to the seat structure, rather than being removed from the structure, as in the present airline seat parachute invention.

U.S. Pat. No. 3,862,731 issued on Jan. 28, 1975 to Robert G. McIntyre, titled "Zero-Delay Speed/Altitude Controlled Ejection Seat," describes a system which bypasses or overrides the normal parachute opening delay system, to cause the parachute to deploy more rapidly in the event of low altitude and/or low airspeed use. The present airline seat parachute system may make use of automated devices for opening the parachute, as disclosed in the McIntyre '731 U.S. Patent, which disclosure is incorporated herein by reference. While McIntyre discloses a parachute which is automatically deployed when the ejection seat separates from the flight crewmember, the parachute is worn on the back of the flight crewmember, rather than being stored within the seat back.

U.S. Pat. No. 4,004,764 issued on Jan. 25, 1977 to Vernon D. Burklund et al., titled "Drogue Chute Extraction," describes yet another ejection seat mechanism using a rocket to deploy a drogue chute, which in turn deploys the main parachute. The main chute remains affixed to the seat structure, unlike the present airline seat parachute which separates from the seat back for use.

U.S. Pat. No. 4,306,748 issued on Dec. 22, 1981 to Kenneth Sullivan, titled "Life Jacket Installation," describes a life jacket which is stored in the bottom and back of a seat, with the assembly primarily intended for use in a hovercraft or other high speed watercraft, rather than in an airliner. Accordingly, no parachute is disclosed by Sullivan, and the overall life jacket apparatus of Sullivan is considerably bulkier than is suitable for placement only within the seat back.

U.S. Pat. No. 4,527,758 issued on Jul. 9, 1985 to Peter Ayoub et al., titled "Deployment Sequence Mode Selection System For Aircraft Ejection Seat," describes an electronic system which takes into account the airspeed, altitude, and rate of descent of the ejection seat and its flight crewmember, to determine the optimum deployment of the parachute. No parachute or seat structure is disclosed by Ayoub et al.

U.S. Pat. No. 4,619,623 issued on Oct. 28, 1986 to Bernt Elverskog, titled "Life-Jacket Assembly," describes an emergency use device stored in an aircraft seat back assembly. The Elverskog life jacket is deployed by opening the top cover for the seat back; the front cover for the seat back is permanently attached to the seat back structure. Elverskog does not disclose separation of the front cover of the seat back from the remainder of the seat back structure, nor capture of that front cover between a parachute (or any other emergency device) and the person wearing or using the parachute, as provided by the present invention. Also, Elverskog does not provide any means for a complete six point harness to be secured from his device to the person using the device, through the permanently affixed front panel of the seat back upholstery.

U.S. Pat. No. 4,709,885 issued on Dec. 1, 1987 to James W. Martin, titled "Parachute System And Aircraft Ejection Seat Incorporating The Same," describes a seat mounted drogue and main parachute system, closely resembling the system of the Stencel '499 U.S. Patent discussed further above. The same points of difference noted in that discussion, are seen to apply here as well.

U.S. Pat. No. 4,765,570 issued on Aug. 23, 1988 to Gerald F. Herndon, titled "Aircraft Ejected Seat Stabilizing And Delayed Parachute System," describes a system wherein the parachute harness is attached directly to the flight crewmember, but which utilizes an ejection seat to remove the flight crewmember and his parachute from the aircraft. The parachute is not stored within any part of the seat, but rather is donned by the flight crewmember before being seated in the ejection seat. Accordingly, no separable panel securing a parachute within the back of a seat structure, is disclosed by Herndon.

U.S. Pat. No. 4,775,119 issued on Oct. 4, 1988 to Armand J. Aronne, titled "Aircraft Crew Multipurpose, Unitary Backpack For Bailout And Survival," describes a backpack assembly worn by the flight crewmember, with the assembly containing a parachute and additional survival gear. The flight crewmember wears the assembly while seated in the aircraft, but the assembly remains with the crewmember at all times in the aircraft, rather than being secured within the seat back structure and concealed behind the front panel of the seat back upholstery, as in the present invention.

U.S. Pat. No. 4,865,273 issued on Sep. 12, 1989 to Leon Jones, titled "Parachute-Release Mechanism And Method," describes an aneroid device for automatically deploying a parachute at a predetermined altitude. The present emergency parachute system may include such a device as well, with the disclosure of the Jones '273 U.S. Patent being incorporated herein by reference.

U.S. Pat. No. 5,213,392 issued on May 25, 1993 to John M. Bostrom, titled "Seat Construction," describes a seat back with an open area between the two side bolsters. A housing extends rearwardly from the seat back, to provide room for a large oxygen cylinder. The Bostrom seat is intended for firefighters who require such supplemental breathing apparatus, and is not suitable for the comfort of a passenger in a vehicle. Bostrom does not disclose any form of parachute with his seat, nor any form of front surface upholstery cover overlying the seat back structure to secure a parachute therein, as provided by the present invention.

U.S. Pat. No. 5,342,109 issued on Aug. 30, 1994 to David L. Berry et al., titled "Seat Having Life Jacket Contained Therein," describes a seat back structure having a hollowed central area for a life jacket. The front of the seat back has an openable upholstery panel using Velcro® for securing along three sides, but having its upper edge permanently secured to the forward side of the seat back, just below the conventional headrest. In order to remove the life jacket from the Berry et al. seat back, the front upholstery panel must be lifted upwardly and back over the headrest. This is unworkable with the present invention, for two reasons: (1) the passenger would be unable to escape while wearing the parachute harness with the seat back upholstery captured between the parachute and passenger, as the Berry et al. upholstery panel is permanently affixed to the seat back at the headrest; and (2) folding the Berry et al. upholstery panel over the headrest, would preclude access to the top of the chute and rip cord D-ring.

U.S. Pat. No. 5,825,667 issued on Oct. 20, 1998 to Eric Van Den Brock, titled "Parachute Release Device," describes an automated parachute opening device, which senses acceleration to determine a maximum velocity of a falling person and cause the chute to open before that velocity is exceeded. The Van Den Brock device incorporates an aneroid pressure sensor to provide altitude information, as well as other sensors. The Van Den Brock device is intended for use by sport parachutists, rather than as an emergency device per se. Accordingly, Van Den Brock does not disclose any form of seating in which a parachute is stored for emergency use, as provided by the present invention. However, the present emergency parachute system may make use of an aneroid device to provide for automatic opening of the chute, as noted further above.

U.S. Pat. No. 5,979,829 issued on Nov. 9, 1999 to Nell W. Nance et al., titled "In-Flight Evacuation System," describes a system in which each passenger seat has a parachute and survival kit in the seat back portion. In an emergency, the seats rotate 180 degrees and move along tracks to a rear exit. The seat back separates from the seat bottom, with the bottom remaining with the aircraft and the back remaining with the passenger, who descends using the parachute deploying from the seat back. The present invention contrasts by leaving the relatively bulky seat back behind, and requires little, if any, modification to the airframe itself. However, Nance et al. disclose the general structure of a conventional passenger carrying commercial aircraft in their '829 U.S. Patent, which disclosure is incorporated herein by reference.

British Patent Publication No. 640,520 published on Jul. 19, 1950 to James Martin of Martin-Baker Aircraft Company, titled "An Ejection Seat For Aircraft," describes an early pyrotechnically actuated ejection seat. The only parachute mechanism incorporated with the seat per se, is a relatively small drogue chute which deploys immediately after ejection. The primary parachute is worn by the flight crewmember at all times, and is not stored or contained within the seat back prior to use, as it is in the present invention.

British Patent Publication No. 2,118,498 published on Nov. 2, 1983 to Autoflug GmbH, titled "Air-Sea Rescue Apparatus," describes an automated actuation system for operating components of a survival system after an emergency bailout. Most of the elements of the survival system are located in the bottom of the seat. No seat back structure is disclosed, either conventionally or having a parachute contained therein.

Finally, PCT Patent Publication No. 00/56,600 published on Sep. 28, 2000 to Simula, Inc., titled "Adjustable Emergency Ejection Seat," describes a seat mechanism having vertical and fore-aft adjustment. No parachute system nor space for housing a parachute in the seat back structure, is disclosed in the PCT Patent Publication.

None of the above inventions and patents, taken either singularly or in combination, is seen to describe the instant invention as claimed. Thus an airline seat parachute solving the aforementioned problems is desired.

SUMMARY OF THE INVENTION

The present invention comprises two embodiments of a passenger parachute system for use with airline or other commercial aircraft. In a first embodiment, the seat back of each passenger seat has a receptacle therein, in which an emergency parachute is stored during normal operations. The parachute harness extends forwardly from the seat back, between the edge of the removable front upholstery panel and the remainder of the seat back structure, for donning by the seated passenger. The front upholstery panel of the seat back, which conceals and protects the emergency chute during normal operations, is secured to the periphery of the seat back by removable fastener means, e.g., Velcro®. The top of the seat back and emergency parachute are covered by a separate flap, which remains permanently attached to the seat back along its rearward edge. However, the forward and lateral edges of the flap are removably attached (e.g., Velcro®, etc.) respectively to the removable front upholstery panel and top edges of the seat back.

When the emergency chute is needed, the passenger need only pull away from the seat with the chute harness secured around the passenger, to pull away the removable front upholstery panel of the seat back and parachute from the seat back structure. The removable upholstery panel remains captured between the passenger and the parachute. In the event that the seat structure separates from the aircraft in its entirety, the passenger need only open the upper flap to access the rip cord handle, with deployment of the parachute causing the remainder of the seat back to pull away.

A second embodiment comprises a smaller six point harness, adapted for use by infants and small children who are otherwise not seated within individual passenger seats within the aircraft. This child harness is not equipped with a parachute, but includes a series of sturdy fasteners (e.g., D-rings or the like) which are permanently secured to the front of the harness. An adult parent or guardian passes his or her harness through the D-rings of the child harness, to secure the child to the adult in a face-to-face relationship. The relatively light weight of the child will not significantly increase the descent rate of the adult in his or her parachute.

Accordingly, it is a principal object of the invention to provide an airline seat parachute system, with an emergency parachute contained within the seat back structure of each passenger seat of an airliner or other commercial aircraft.

It is another object of the invention to conceal such an emergency parachute within the seat back structure, by means of a removably installed front upholstery panel for the seat back which covers the emergency parachute therein and which allows the harness of the parachute to extend therefrom for donning by a passenger seated within the seat.

It is a further object of the invention to provide such an emergency parachute system which provides rapid access to the rip cord of the parachute, even though the parachute remains in its stored location within the seat back, for actuation by the passenger in the event the seat separates from the aircraft.

Still another object of the invention is to provide a child harness which is removably attachable to the adult harness.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises two embodiments of an emergency escape system for passengers of a passenger carrying, commercial aircraft. A first embodiment of the present invention is illustrated in FIGS. 1 through 4 of the drawings, and comprises an emergency parachute 10 which is removably installed within a parachute receptacle 12 within the seat back portion 14 of an airline passenger seat assembly 16. A second embodiment is illustrated in FIG. 4 of the drawings, and comprises a child's harness which may be removably secured to the harness assembly 18 of the emergency parachute 10 of FIGS. 1 through 4.

Figure 1:
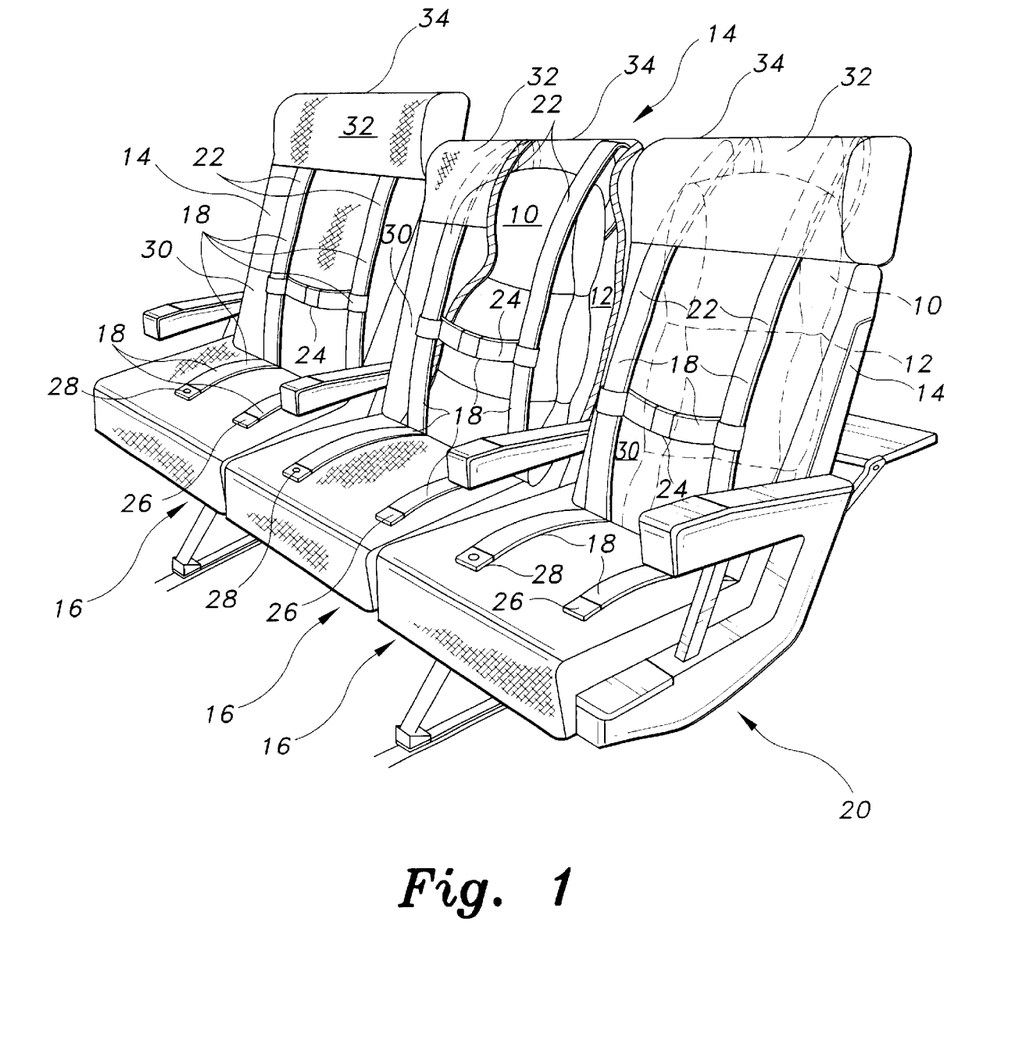
FIG. 1 is an environmental, perspective view of an airline passenger seating row incorporating the seat parachutes of the present invention.
Figure 2:
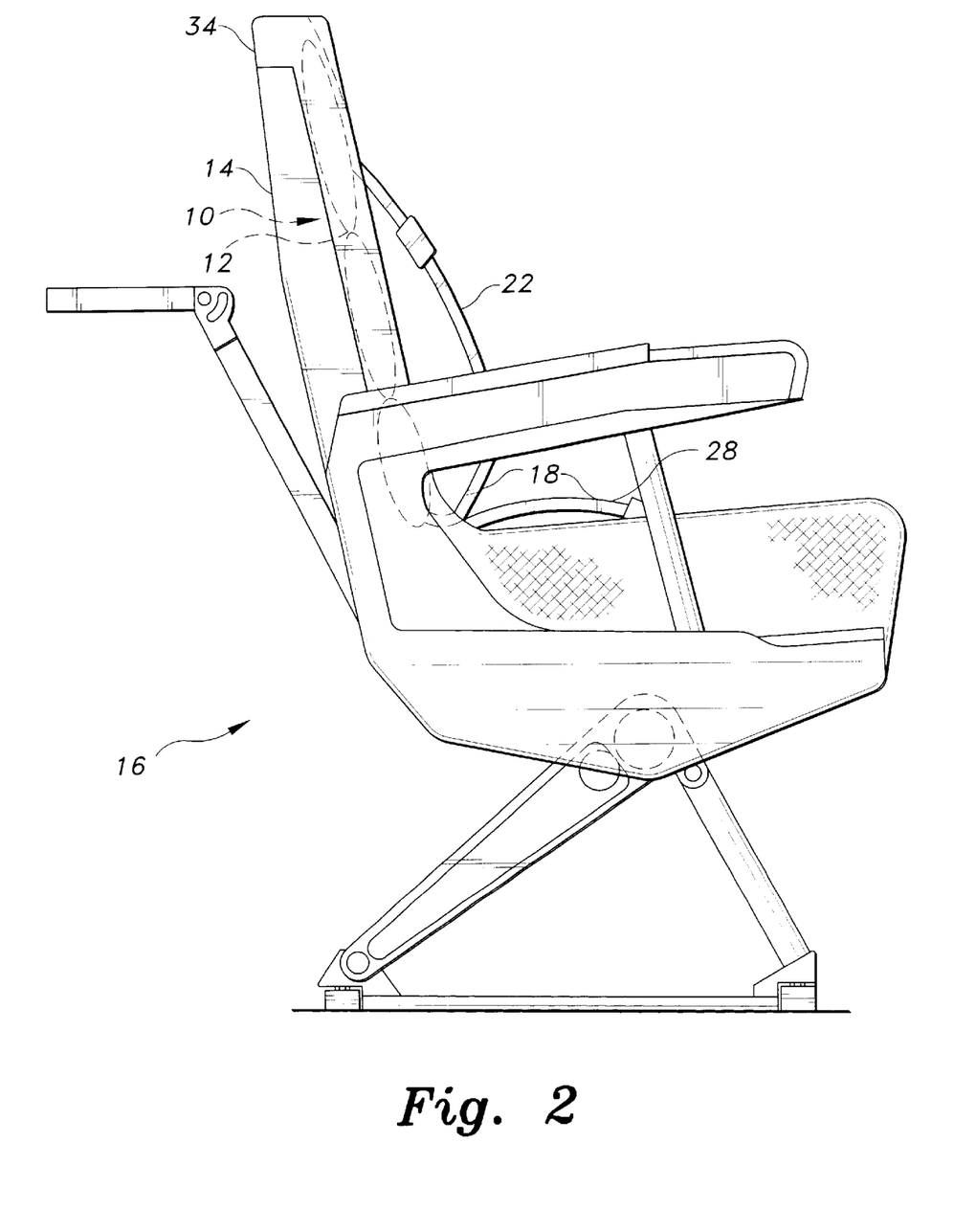
FIG. 2 is a side elevation view of an individual airline passenger seat, showing an individual passenger parachute stored within the seat back thereof, according to the present invention.

FIG. 1 illustrates a typical airline passenger seating row 20, with each of the seat assemblies 16 comprising the seat row 20 having a seat back portion 14 containing an emergency parachute 10 within a parachute receptacle 12 therein. Each of the emergency parachutes 10 includes a conventional six point harness assembly 18, comprising a pair of shoulder straps 22, a lateral chest strap 24, left and right leg straps 26 and 28, and a conventional waist strap (not shown, for clarity in the drawing FIGS.). The seat back portions 14 are each covered with a removable front upholstery panel 30, with each parachute 10 proper being protected and concealed behind the corresponding upholstery panel 30, and with the various straps 22 through 28 extending forwardly from the edges of the upholstery panel 30 where they are accessible for donning by a passenger seated within any of the seats 16.

Figure 3:
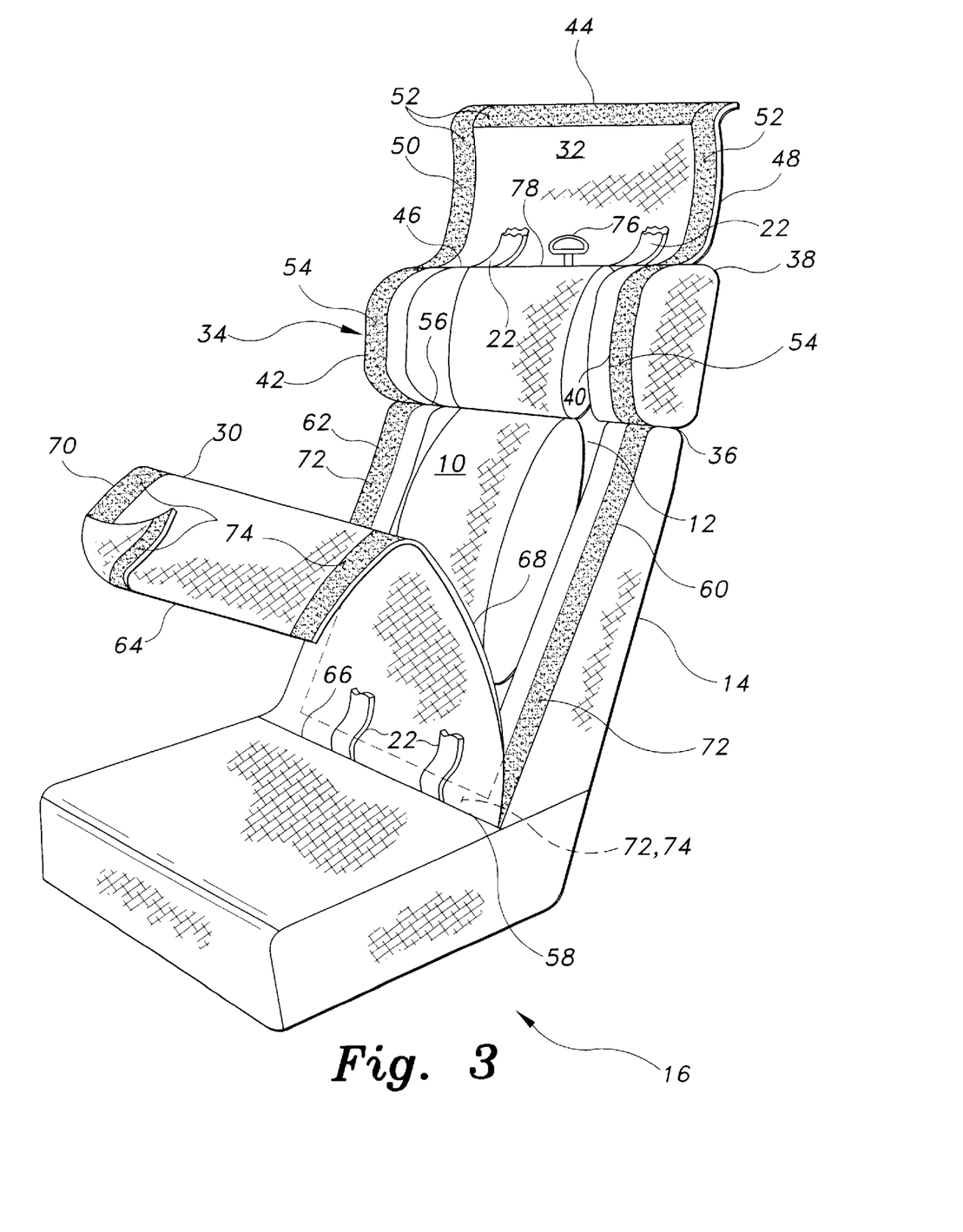
FIG. 3 is a perspective view of an airline passenger seat with the removable seat back upholstery panel partially removed to access the individual parachute stored within the seat back.
Figure 4:
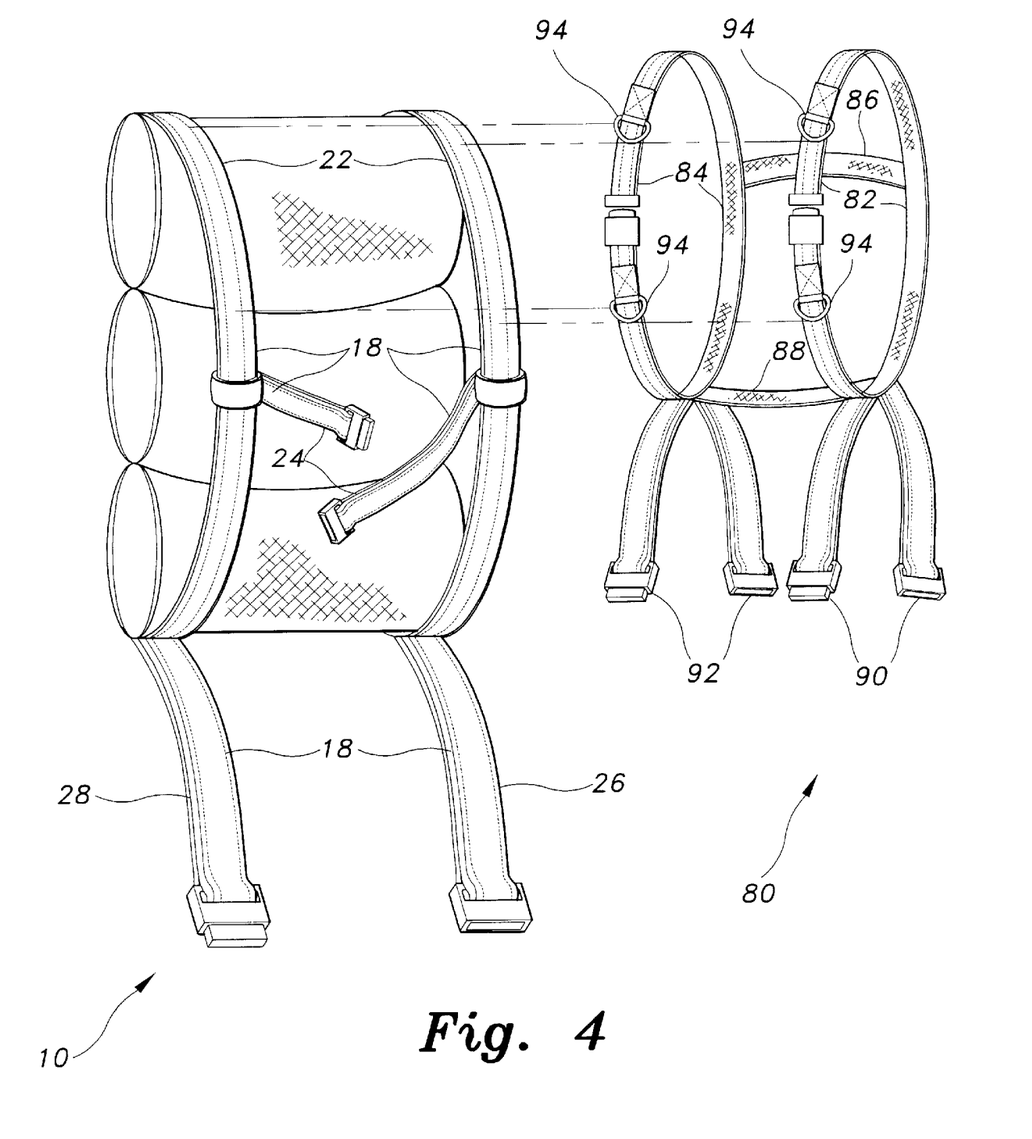
FIG. 4 is an exploded perspective view of one of the present airline passenger parachutes and a smaller child harness, showing the removable attachment of the child harness to the larger parachute harness.

FIG. 3 of the drawings provides an illustration of the partially removed front upholstery panel 30 of the seat back 14, with a separate openable upper panel 32 being shown lifted from the upper or headrest portion 34 of the seat back structure 14 to access the parachute 10. The periphery of the upper seat back structure 34 includes a lower edge 36 which joins the main seat back structure 14, an opposite upper edge 38, and opposed left and right lateral edges 40 and 42. The upper seat back structure 34 is covered by an openable panel 32, as noted above, with the panel 32 having a periphery comprising a lower edge 44, an opposite upper edge 46, and opposed left and right lateral edges 48 and 50. The left and right lateral edges of the upper seat back structure 34 and openable upper panel 32, i.e., upper seat back/panel edges 40/48 and 42/50, are congruent and overlap one another.

The upper or rearward edge 46 of the openable panel 32 is permanently secured (e.g., stitched, etc.) to the corresponding upper edge 38 of the upper seat back portion 34, with the forwardmost or lower edge 44 (when closed over the upper seat back portion 34) being congruent with and overlapping the upper edge of the removable front upholstery panel 30 of the seat back structure 14, as explained further below. The various openable edges 44, 48, and 50 of the openable panel 32 include removable fastening means 52 thereon, e.g., first hook and loop fastening material (Velcro®) with the corresponding lateral edges 40 and 42 of the upper seat back structure 34 and mating upper edge of the front upholstery panel 30 having mating second material 54 thereon.

The primary portion of the seat back structure 14, below the upper or headrest portion 34, has a periphery defined by an upper edge 56, an opposite lower edge 58, and opposed left and right lateral edges 60 and 62, with the emergency parachute receptacle 12 being contained within these peripheral edges 56 through 62 and with the upper portion of the parachute 10 extending upwardly into the upper seat back portion 34 as required. The periphery of the removable front upholstery panel 30 is defined by an upper edge 64, an opposite lower edge 66, and opposed left and right edges 68 and 70. As in the case of the upper seat back portion 34 of the seat back structure 14, and its openable upper cover 32, the periphery of the seat back structure 14, comprising edges 56 through 62, and the periphery of the removable front panel 30 of the seat back structure 14, comprising edges 64 through 70, are congruent with one another, with the removable panel edges 64 through 70 overlapping the corresponding edges 56 through 62 of the seat back structure 14.

As in the case of the upper seat back portion 34 and its cover 32, the edges 58 through 62 of the seat back structure 14, and lower edge 44 of the openable cover 32, have a first type of separable fastener material 72 disposed thereon, which removably engages a mating second type of fastener material 74 disposed upon the edges 64 through 70 of the removable front panel 30 of the seat back structure 14. The mating first and second fastener material 72 and 74 is preferably hook and loop material (e.g., Velcro®), although other fasteners (snaps, etc.) may be used as desired.

The hook and loop fastener material 72 disposed along the sides 60 and 62 and bottom edge 58 of the main seat back structure 14, faces forwardly so as to engage the rearwardly facing mating material 74 along the sides 68 and 70 and lower edge 66 of the removable seat back upholstery panel 30. However, the fastener material 74 along the upper edge 64 of the removable panel 30 faces forwardly when the panel 30 is in place, as shown by the upturned right hand corner of the panel 30 in FIG. 3. This allows the rearwardly facing and mating fastener material 52 installed along the rearwardly facing lower edge 44 of the openable upper cover 32, to overlap the upper edge 64 of the lower panel 30 and engage the mating fastener material 74 to provide a complete seal around the enclosed parachute 10 within the seat back structure 14, excepting the areas where the various harness straps 18, 26, 28, etc. extend from between the upholstery panel 30 and seat back structure 14 edges, and/or between the upper edge 64 of the removable panel 30 and overlapping lower edge 44 of the openable upper cover 32.

The parachute 10 is readied for potential use by opening the upper cover 32 and removing the seat back upholstery panel 30 from the seat back structure 14, and placing the parachute 10 within the seat back receptacle 12. All harness buckles and closures are opened at this time, with the various harness straps 22, 26, 28, etc. extended from the parachute receptacle 12. The removable cover 30 is then reinstalled over the parachute 10, and the upper cover folded downwardly and attached along its edges to the upper seat back structure 34 and upper edge 64 of the removable cover 30.

When the passenger boards, he or she need only secure the parachute harness 18 about his/her body, and rest assured that an emergency escape from the aircraft is possible using the parachute 10. (A woman wearing a dress or skirt may forgo securing the leg straps 26 and 28 until they are needed.) In the event that evacuation is necessary from the aircraft in flight, the passenger need only release his/her conventional seat belt (not shown in the drawings, for clarity) and pull forward from the seat, thereby pulling the removable fastener material apart which holds the removable upholstery panel 30 to the seat back structure 14, and which holds the openable upper cover 32 in place. Alternatively, the passenger may manually separate the various fasteners 52, 54 and 72, 74, if so desired. The removable upholstery panel 30 remains captured between the back of the passenger and the parachute 10, as the parachute 10 and upholstery panel 30 are pulled from the seat back structure 14.

It will be noted in FIG. 3 that the rip cord handle 76 extends from the upper portion 78 of the parachute 10, rather than its more conventional location near the center of the harness 18. In the event of a catastrophic structural failure, where the seat(s) 16 and/or seat row(s) 20 are torn from the aircraft, the passenger may still be saved by the present invention. In such an event, if the passenger is still conscious and able to respond, he/she need only unfasten his/her seat belt, open the upper panel 32, and pull the rip cord handle 76 extending from the upper portion 78 of the parachute 10.

The opening shock of the parachute 10 will likely separate the parachute 10 from the remainder of the seat structure 16, causing the releasable fastener material along the edges of the removable panel 30 to separate from the seat structure 16, just as if the passenger separated him or herself from the seat structure 16 while still in the aircraft. However, it is likely in such a catastrophic accident that the passenger would be rendered unconscious, and unable to open his/her parachute 10. Accordingly, a conventional automatic opening device (aneroid, etc.) may be included with the parachute 10, to assure that the chute 10 will open as required without manual intervention. Such devices are well known in the art, with disclosures of such devices noted further above in the discussion of the related art, and incorporated herein by reference.

FIG. 4 of the drawings illustrates a further embodiment of the present invention, comprising a child harness 80 which is devoid of any parachute attachment per se. Federal Aviation Regulations and most airline rules, allow infants, toddlers, and small children who may be seated or carried upon the lap of a parent or guardian, to be carried in such a manner, rather than being required to have their own seat. Such a small child would thus not have access to the seat mounted parachute and harness of the present invention. In any event, the harness 18 of the seat stored emergency parachute 10 of the present invention, would not likely provide sufficient adjustment to fit a very small child or toddler.

Accordingly, a child harness 80 is provided, which removably attaches to the parachute harness 18 of the emergency parachute 10 of the present invention. The child harness 80 is preferably a smaller version of a conventional six point harness, including a pair of front and rear straps 82, 84 which pass generally vertically over the shoulders and between the legs, with the two straps 82 and 84 being secured together laterally by upper and lower lateral back straps 86 and 88. A pair of left leg straps 90 and right leg straps 92 complete the harness assembly 80. The child harness 80 does not include a parachute, but rather includes a series of removable fasteners (e.g., D-rings 94, etc.) extending from the front straps 82 and 84, which may be removably secured to the parachute harness 18.

The child harness 80 is secured to the primary parachute harness 18 by opening the two vertical front or shoulder straps 22 of the harness 18, and passing the ends through the appropriate D-rings 94 of the child harness 80, once the child has been secured within the harness 80. The child is secured in a face-to-face relationship with the adult wearing the parachute 10 and its harness 18, to provide a more comforting relationship. The relatively light weight of a infant, toddler, or very small child, produces a negligible increase in the sink rate of the emergency parachute 10, thus allowing the parachute 10 to save both lives, if at all possible.

In conclusion, the present airline seat parachute, along with its additional embodiment including a child harness which is removably attachable to the primary parachute harness, provides a response to many potentially disastrous situations in aviation. While the present invention may not be able to save a significant number of lives in many aviation disasters where extremely high altitudes and speeds are involved, the potential for saving even a few lives under the right circumstances, serves to justify the present invention. While the present invention is directed primarily to commercial airline passengers, it may also be adapted for use by flight and cabin crewmembers as well, and may find even more practicable use in lighter commercial charter and air taxi aircraft. The present airline seat parachute will not only provide some potential for saving lives, but will greatly enhance the peace of mind of passengers flying in aircraft so equipped.

It is to be understood that the present invention is not limited to the embodiments described above, but encompasses any and all embodiments within the scope of the following claims.

I claim:

1. An emergency parachute system for a commercial aircraft, comprising:
    at least one passenger seat having a seat back structure;
    a removable front upholstery panel, covering said seat back structure, said seat back structure and said removable front upholstery panel, each having a congruent periphery;
    first and second mating upholstery panel attachment fasteners disposed respectively about the periphery of said seat back structure and about the periphery of said removable front upholstery panel, securing said removable front upholstery panel removably to said seat back structure;
    a parachute receptacle disposed within said seat back structure behind said removable front upholstery panel;
    an emergency parachute stored within said parachute receptacle and concealed by said removable front upholstery panel; and
    a parachute harness extending forwardly from said emergency parachute, between and from said congruent periphery of said seat back structure and extending in front of said removable front upholstery panel.

2. The emergency parachute system according to claim 1, further including:
    an upper seat back structure portion having a periphery comprising a lower edge, an upper edge opposite said lower edge, and opposed lateral edges, said removable front upholstery panel having an upper edge disposed adjacent the lower edge of said upper seat back structure portion;
    an openable upper panel having a periphery comprising a lower edge, an upper edge opposite said lower edge, and opposed lateral edges, the upper edge and the opposed lateral edges of said upper seat back structure portion and of said openable upper panel being congruent with one another;
    the lower edge of said openable upper panel and the upper edge of said removable front upholstery panel being congruent with one another;
    the upper edge of said openable upper panel being permanently secured to the upper edge of said upper seat back structure portion;
    the opposed lateral edges of said openable upper panel being removably secured to the opposed lateral edges of said upper seat back structure portion; and
    first and second openable mating panel attachment fasteners disposed respectively about the lower edge and the opposed lateral edges of said openable upper panel, and about the upper edge of said removable front upholstery panel and the lateral edges of said upper seat back structure portion, securing the lower edge and the opposed lateral edges of said openable upper panel removably respectively to the upper edge of said removable front upholstery panel and to the opposed lateral edges of said upper seat back structure portion.

3. The emergency parachute system according to claim 2, wherein said first and second openable mating panel attachment fasteners comprise mating first and second strips of hook and loop fastener material.

4. The emergency parachute system according to claim 1, wherein said first and second mating upholstery panel attachment fasteners comprise mating first and second strips of hook and loop fastener material.

5. The emergency parachute system according to claim 1, wherein:
    said emergency parachute has an upper portion; and
    said emergency parachute further comprises a rip cord extending from the upper portion of said emergency parachute.

6. The emergency parachute system according to claim 1, further including an automatic opening device connected to said parachute for opening said emergency parachute.

7. The emergency parachute system according to claim 1, further including:
    a child harness, devoid of parachute means therewith, the harness having at least a pair of front straps; and
    a plurality of emergency parachute harness attachments disposed upon the front straps of said child harness, for removably securing said child harness to said harness of said emergency parachute.

8. The emergency parachute system according to claim 7, wherein said emergency parachute harness attachments of said child harness comprise a plurality of D-rings for removably installing upon said harness of said emergency parachute.

9. The emergency parachute system according to claim 7, wherein said child harness comprises a six point harness.

10. The emergency parachute system according to claim 1, wherein said parachute harness comprises a six point harness.

11. A passenger carrying commercial aircraft and a passenger emergency parachute system therefor, comprising in combination:
    a passenger carrying commercial aircraft having at least one passenger compartment;
    at least one passenger seat disposed within said passenger compartment of said aircraft, said seat having a seat back structure;

a removable front upholstery panel, covering said seat back structure, said seat back structure and said removable front upholstery panel, each having a congruent periphery;

first and second mating upholstery panel attachment fasteners disposed respectively about the periphery of said seat back structure and about the periphery of said removable front upholstery panel, securing said removable front upholstery panel removably to said seat back structure;

a parachute receptacle disposed within said seat back structure behind said removable front upholstery panel;

an emergency parachute stored within said parachute receptacle and concealed by said removable front upholstery panel; and a parachute harness extending forwardly from said emergency parachute, between and from said congruent periphery of said seat back structure and extending in front of said removable front upholstery panel.

12. The passenger carrying commercial aircraft and passenger emergency parachute system combination according to claim 11, further including:

an upper seat back structure portion having a periphery comprising a lower edge, an upper edge opposite said lower edge, and opposed lateral edges, said removable front upholstery panel having an upper edge disposed adjacent the lower edge of said upper seat back structure portion;

an openable upper panel having a periphery comprising a lower edge, an upper edge opposite said lower edge, and opposed lateral edges, the upper edge and the opposed lateral edges of said upper seat back structure portion and of said openable upper panel being congruent with one another;

the lower edge of said openable upper panel and the upper edge of said removable front upholstery panel being congruent with one another;

the upper edge of said openable upper panel being permanently secured to the upper edge of said upper seat back structure portion;

the opposed lateral edges of said openable upper panel being removably secured to the opposed lateral edges of said upper seat back structure portion; and first and second openable mating panel attachment fasteners disposed respectively about the lower edge and the opposed lateral edges of said openable upper panel, and about the upper edge of said removable front upholstery panel and the lateral edges of said upper seat back structure portion, securing the lower edge and the opposed lateral edges of said openable upper panel removably respectively to the upper edge of said removable front upholstery panel and to the opposed lateral edges of said upper seat back structure portion.

13. The passenger carrying commercial aircraft and passenger emergency parachute system combination according to claim 12, wherein said first and second openable mating panel attachment fasteners comprise mating first and second strips of hook and loop fastener material.

14. The passenger carrying commercial aircraft and passenger emergency parachute system combination according to claim 11, wherein said first and second mating upholstery panel attachment fasteners comprise mating first and second strips of hook and loop fastener material.

15. The passenger carrying commercial aircraft and passenger emergency parachute system combination according to claim 11, wherein:

said emergency parachute has an upper portion; and said emergency parachute further comprises a rip cord extending from the upper portion of said emergency parachute.

16. The passenger carrying commercial aircraft and emergency parachute system combination according to claim 11, further including an automatic opening device connected to said parachute for opening said emergency parachute.

17. The passenger carrying commercial aircraft and passenger emergency parachute system combination according to claim 11, further including:

a child harness, devoid of parachute means therewith, the harness having at least a pair of front straps; and a plurality of emergency parachute harness attachments disposed upon the front straps of said child harness, for removably securing said child harness to said harness of said emergency parachute.

18. The passenger carrying commercial aircraft and passenger emergency parachute system combination according to claim 17, wherein said emergency parachute harness attachments of said child harness comprise a plurality of D-rings for removably installing upon said harness of said emergency parachute.

19. The passenger carrying commercial aircraft and passenger emergency parachute system combination according to claim 17, wherein said child harness comprises a six point harness.

20. The passenger carrying commercial aircraft and passenger emergency parachute system combination according to claim 11, wherein said parachute harness comprises a six point harness.

* * * * *